Dec. 29, 1925.
1,567,234
H. BRUCKER
COMBINATION BAKING PAN
Filed March 7, 1922
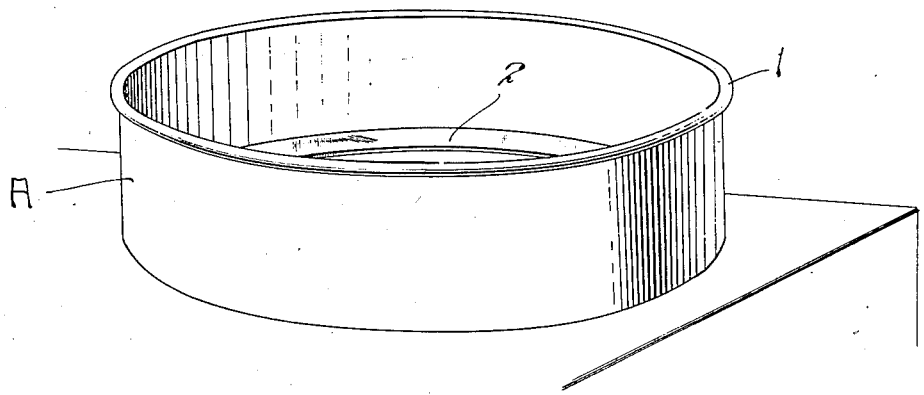
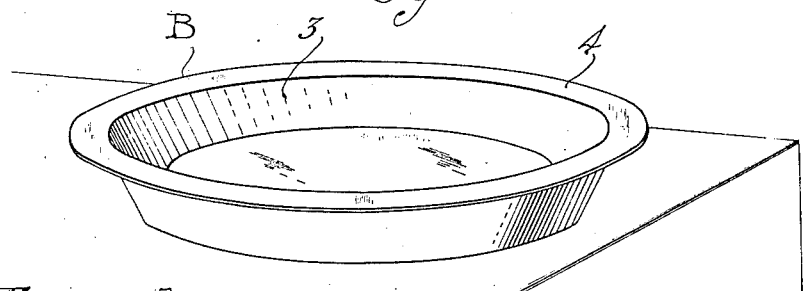
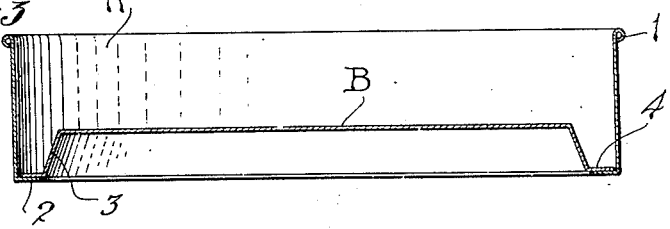
INVENTOR
Henry Brucker,
BY
Everett H. Rook,
ATTORNEYS.

Patented Dec. 29, 1925.

1,567,234

UNITED STATES PATENT OFFICE.

HENRY BRUCKER, OF NEWARK, NEW JERSEY, ASSIGNOR TO AMERICAN ALUMINUM WARE CO., A CORPORATION OF NEW JERSEY.

COMBINATION BAKING PAN.

Application filed March 7, 1922. Serial No. 541,672.

*To all whom it may concern:*

Be it known that I, HENRY BRUCKER, a citizen of the United States, and a resident of Newark, in the county of Essex and State of New Jersey, have invented new and useful Improvements in Combination Baking Pans, of which the following is a specification.

The objects of the invention are to provide a baking pan comprising a plurality of parts which are adapted to cooperate with each other to bake cake and the like; to provide a baking pan comprising a pan rim and a removable bottom therefor which when arranged in said rim forms therewith a pan to bake the body of a filler cake, said bottom being also adapted to serve individually as a pan for baking pie and the like; to thus provide a pan rim having an inwardly projecting annular flange at one end, and a pie baking pan having an annular flange at its edge adapted when the pie pan is inverted to rest upon said flange of the pan rim and form a removable bottom therefor to adapt the pan rim for baking the body of a filler cake; said pie pan when removed from said pan rim being adapted to bake the filler for the filler cake; and to obtain other results and advantages as may be brought out by the following description.

Referring to the accompanying drawings, in which like numerals of reference indicate the same parts throughout the several views.

Figure 1 is a perspective view of the rim of the combination baking pan embodying my invention;

Figure 2 is a perspective view of one of the removable bottoms to cooperate with said rim and comprising a pie baking pan;

Figure 3 is a vertical sectional view through the pan showing the rim and pie-baking pan bottom assembled for baking the body of a filler cake.

In the embodiment of my invention shown on the drawings, the reference character A designates the rim of the pan which is formed of any suitable material, preferably aluminum, the said rim being shown in the present instance as substantially cylindrical and open at both ends, the edges at one end being returned to form a reenforcing bead 1 and at the other end an inwardly projecting annular flange 2. The removable bottom B comprises a pan having inclined side walls 3 and an annular flange 4 at the edge thereof, said pan being of a diameter to freely fit within the pan rim A. When the pan B is inverted and slipped into the rim A, the flange 4 of the pan B rests upon the flange 2 of the rim so that the pan B forms a removable bottom for the rim, and the side walls and bottom of the pan B are spaced from the sides of the rim A and project upwardly into the rim as clearly shown in Figure 3. The pan B thus arranged in the rim A produces a baking pan particularly adapted for baking the body of a filler cake, the annular channel between the rim and the side walls of the pan B serving to form the rim on the cake. When the pan B is removed from the rim and turned right side up, it may be utilized for baking the filler for the depression in the top of the body of the filler cake, and can also be used for baking pies or the like.

While I have shown this embodiment of my invention, it will be understood that it is only for the purpose of illustrating the principles thereof, and that modifications and changes can be made in the detail construction of the parts of the pan without departing from the spirit or scope of the invention. Therefore, I do not desire to be understood as limiting myself except as required by the following claim when construed in the light of the prior art.

Having thus described the invention, what I claim is:

A filler-cake baking-pan, comprising a rim open at both ends and having an inwardly projecting annular flange at one end, and a pan having a closed bottom and inclined side walls with an annular flange projecting outwardly from the edge of said side walls and adapted to fit within said rim and form a dough-tight joint upon said annular flange of the rim with its side walls projecting upwardly into said rim in spaced relation thereto, said rim and pan combined as set forth forming a baking dish for the cake body with a bottom to seat on the oven floor and the pan forming a recess in said cake body and the pan when removed from the rim forming a baking dish for a filler for said recess with a bottom to seat on the oven floor.

HENRY BRUCKER.